United States Patent
Kumar et al.

(10) Patent No.: US 10,573,037 B2
(45) Date of Patent: Feb. 25, 2020

(54) METHOD AND APPARATUS FOR MENTORING VIA AN AUGMENTED REALITY ASSISTANT

(71) Applicant: SRI International, Menlo Park, CA (US)

(72) Inventors: Rakesh Kumar, West Windsor, NJ (US); Supun Samarasekera, Princeton, NJ (US); Girish Acharya, Redwood City, CA (US); Michael John Wolverton, Mountain View, CA (US); Necip Fazil Ayan, Sunnyvale, CA (US); Zhiwei Zhu, Princeton, NJ (US); Ryan Villamil, Plainsboro, NJ (US)

(73) Assignee: SRI International, Menlo Park, CA (US)

( * ) Notice: Subject to any disclaimer, the term of this patent is extended or adjusted under 35 U.S.C. 154(b) by 306 days.

(21) Appl. No.: 13/721,276

(22) Filed: Dec. 20, 2012

(65) Prior Publication Data
US 2014/0176603 A1 Jun. 26, 2014

(51) Int. Cl.
*G09G 5/00* (2006.01)
*G06T 11/60* (2006.01)
*G06F 3/01* (2006.01)

(52) U.S. Cl.
CPC .............. *G06T 11/60* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 2001/0041978 A1* | 11/2001 | Crespo et al. | 704/257 |
| 2003/0101151 A1* | 5/2003 | Holland | G06N 3/004 706/45 |
| 2004/0193413 A1* | 9/2004 | Wilson | G06F 3/017 704/243 |
| 2009/0083205 A1* | 3/2009 | Dishongh et al. | 706/46 |
| 2011/0014596 A1* | 1/2011 | Kurenov et al. | 434/262 |
| 2011/0187746 A1* | 8/2011 | Suto | G09G 5/00 345/634 |
| 2012/0117112 A1* | 5/2012 | Johnston et al. | 707/771 |
| 2012/0293506 A1* | 11/2012 | Vertucci et al. | 345/419 |

(Continued)

OTHER PUBLICATIONS

DeVault et al. "Interpreting Vague Utterances in Context", Proceedings of the 20th international conference on Computational Linguistics, p. 1247-es, Aug. 23-27, 2004.*

(Continued)

*Primary Examiner* — Yingchun He
(74) *Attorney, Agent, or Firm* — Moser Taboada

(57) ABSTRACT

A method and apparatus for training and guiding users comprising generating a scene understanding based on video and audio input of a scene of a user performing a task in the scene, correlating the scene understanding with a knowledge base to produce a task understanding, comprising one or more goals, of a current activity of the user, reasoning, based on the task understanding and a user's current state, a next step for advancing the user towards completing one of the one or more goals of the task understanding and overlaying the scene with an augmented reality view comprising one or more visual and audio representation of the next step to the user.

17 Claims, 9 Drawing Sheets

(56) References Cited

U.S. PATENT DOCUMENTS

2013/0083063 A1* 4/2013 Geisner ............... G06T 19/006
                                                                               345/633
2013/0265319 A1* 10/2013 Fisher .................. G06T 13/00
                                                                               345/589

OTHER PUBLICATIONS

Birnholtz et al. "Providing Dynamic Visual Information for Collaborative Tasks: Experiments With Automatic Camera Control", Human-computer Interaction, 1010, vol. 25, pp. 261-287.*
Bremond, "Scene Understanding: perception , multi-sensor fusion, spatio-temporal reasoning and activity recognition", submitted on Apr. 25, 2008 @https://tel.archives-ouvertes.fr/tel-00275889.*

* cited by examiner

METHOD AND APPARATUS FOR MENTORING VIA AN AUGMENTED REALITY ASSISTANT

BACKGROUND OF THE INVENTION

Field of the Invention

Embodiments of the present invention generally relate to interactive task aiding and, more particularly, to a method and apparatus for mentoring via an augmented reality assistant.

Description of the Related Art

Augmented reality (AR) is a real-time view of a physical, real-world environment whose elements are "augmented" by computer-generated sensory input such as sound, video, graphics and positioning data. A display of a real-world environment is enhanced by augmented data pertinent to a use of an augmented reality device. For example, mobile devices provide augmented reality applications allowing users to view their surrounding environment through the camera of the mobile device, while the mobile device determines the location of the device based on global positioning satellite (GPS) data, triangulation of the device location, or other positioning methods. These devices then overlay the camera view of the surrounding environment with location based data such as local shops, restaurants and move theaters as well as the distance to landmarks, cities and the like.

AR systems have not been applied in aiding, mentoring, or training users in completing complex physical tasks, however. Currently, the most commonly used systems for completing complex physical tasks are either pure simulations of tasks, or are interactive voice response (IVR) systems. Pure simulations such as desktop simulations or virtual reality systems merely provide an enhanced version of the common instruction manual and are "hands-off" in that the user is only simulating a task without any physical feedback. IVR systems limit users to a constrained set of questions and limited answer formats causing difficulty in interaction with these systems.

Therefore, there is a need in the art for a method and apparatus for training and mentoring users during operations for completing physical tasks via an augmented reality based virtual assistant.

SUMMARY OF THE INVENTION

An apparatus and/or method for mentoring via an augmented reality based virtual assistant, substantially as shown in and/or described in connection with at least one of the figures, as set forth more completely in the claims.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to mentoring and training users in completing complex physical tasks via an AR system. According to one embodiment, real-time video of a user performing a task is captured through a visual sensor such as a camera. The user also issues verbal communication which is captured by an audio sensor such as a microphone. The captured video and audio are correlated with each other and then a search is performed on a database, which can be local or remote, to determine the nature of the task and the user's current state. Once the task and the user's state are determined, a task understanding is generated with a set of one or more goals and the steps involved in reaching those goals. Steps, tips, or aids are displayed to the user by augmenting the real-time video feed from the visual sensor and projecting the overlaid feed onto a user display such as a head-mounted display or the like. The user's state dictates which steps towards a goal are overlaid on the display.

Figure 1:
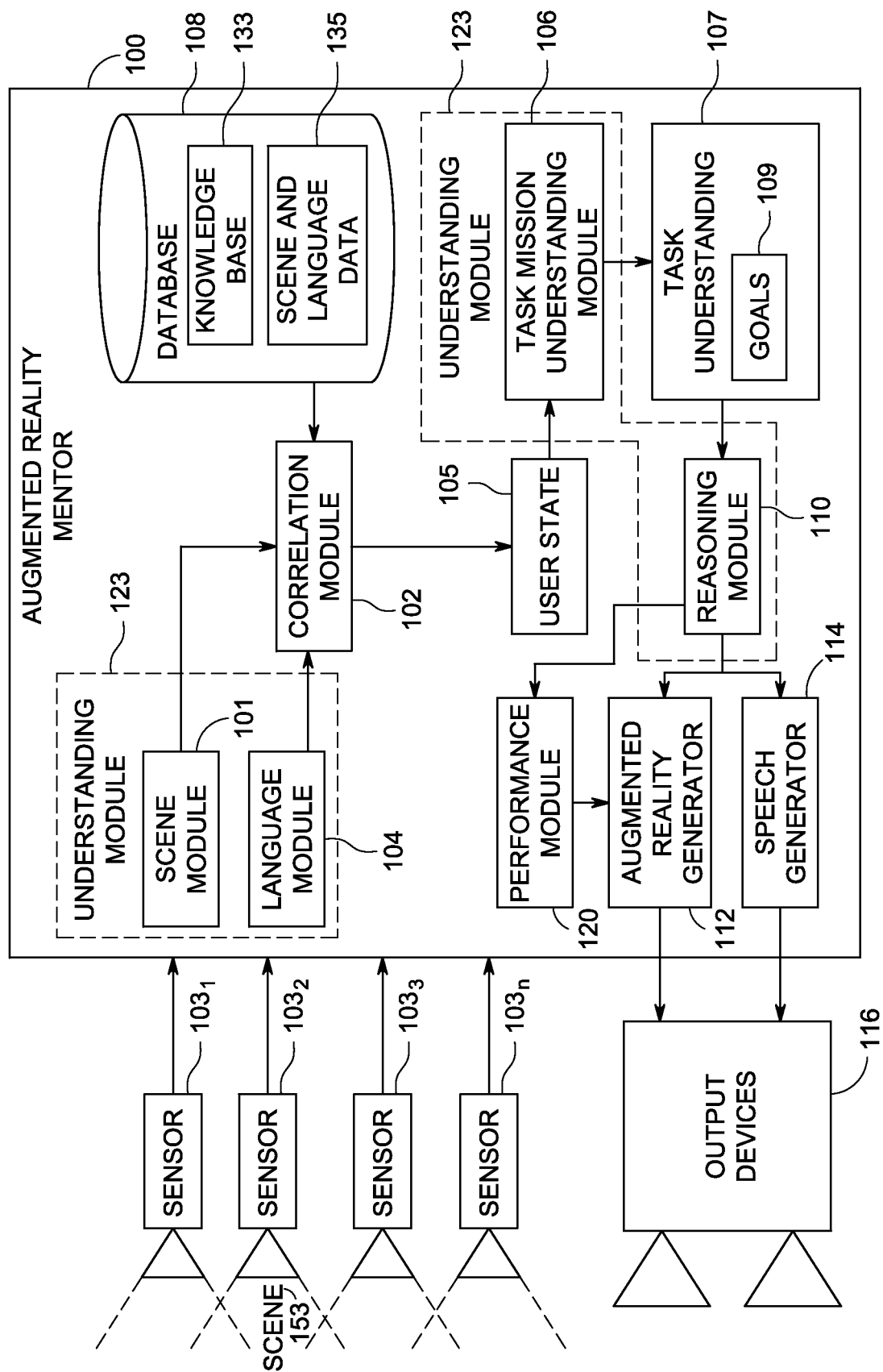
FIG. 1 depicts a functional block diagram of an AR mentor for mentoring users in completing tasks in accordance with at least one embodiment of the present invention.

FIG. 1 depicts a functional block diagram of an AR mentor 100 for mentoring a user in completing complex physical tasks. In one embodiment, a plurality of sensors, 103$_1$ to 103$_n$, provide a video feed of a scene 153 in which a user of the AR mentor 100 is performing a task. The user's task may be repairing a vehicle, modifying a machine part, inspecting equipment, embedded in a learning environment, navigating terrain, machine training or any other task. The AR mentor 100 also provides users with operational and maintenance information regarding their task, mission, equipment and the like.

The AR mentor 100 comprises a scene module 101, a correlation module 102, a language module 104, a task mission understanding module 106, a database 108, a reasoning module 110, an augmented reality generator 112, a speech generator 114 and a performance module 120. The sensors $103_1$ to $103_n$ are coupled to the AR mentor 100, particularly to the scene module 101 and the language module 104. According to some embodiments, a portion of the sensors $103_1$ to $103_n$ are video sensors coupled to the scene module 101 and a portion of the sensors $103_1$ to $103_n$ are audio sensors coupled to the language module 104. The AR Mentor 100 is further communicatively coupled to output devices 116. According to some embodiments, the output devices 116 comprise at least audio and video output devices such as speakers and a display. According to some embodiments, an output display is coupled with input video sensors and an output audio device is coupled with input audio sensors.

As described above, the scene module 101 receives a video feed from a portion of the sensors 1031 to 103n and the language module 104 receives an audio feed from a portion of the sensors. The scene module 104 analyzes the video feed to identify objects in the scene 153 such as equipment, machine parts, vehicles, locations, and the like. The objects are stored in database 108. The scene module 101 extracts visual cues from the video feed to situate the user with respect to the world, including any equipment the user is being trained on. The exact relative position and head orientation of the user is tracked continually by a portion of the sensors 1031 to 103n. The visual cues and observed scene characteristics are used by the scene module 102 to understand user action and intents.

The language module 104 performs natural language processing on the received audio feed, augmenting the scene understanding generated by the scene module 102. The language module 104 is a is a real-time dialog and reasoning system that supports human-like interaction using spoken natural language. The language module 104 is based on automated speech recognition, natural language understanding, and reasoning. The language module 104 recognizes the user's goals and provides feedback through the speech generator 114, discussed below. The feedback and interaction occur both verbally and by engaging the augmented reality system to display icons and text visually on a user's display.

The function of the understanding block (the scene module 102 and the language module 104) is to take low-level sensor data (audio, visual and inertial) and determine intent (or user state 105) of a user in the context of well determined workflow for performing a complex task. As the user performs the task and progresses through the workflow, user intents are automatically generated by the understanding block and are communicatively coupled to the reasoning module 110 that determines the audio-visual guidance to be provided at the next instant.

The correlation module 102 correlates the scene and language data together, stores the scene and language data 135 is stored in database 108 and correlates the data into a user state 105, which according to some embodiments comprises a model of user intent.

According to one embodiment, the task mission understanding module 106 receives the user state 105 as input and generates a task understanding 107. The task understanding 107 is a representation of set of goals 109 that the user is trying to achieve, based on the user state 105 and the scene understanding in the scene and language data 135. A plurality of task understandings may be generated by the task mission understanding module 106, where the plurality of tasks form a workflow ontology. The goals 109 are a plurality of goals which may be a hierarchy of goals, or, a task ontology, that must be completed for a task understanding to be considered complete. Each goal may have parent-goals, sub-goals, and so forth. According to some embodiments, there are pre-stored task understandings that a user may invoke such as "perform oil change", "check fluids" or the like, for which a task understanding does not have to be generated, only retrieved.

The task understanding 107 is coupled to the reasoning module 110 as an input. The reasoning module 110 processes the task understanding 107, along with task ontologies and workflow models from the database 108, and reasons about the next step in an interactive dialog that the AR mentor 100 needs to conduct with the user to achieve the goals 109 of the task understanding 107. According to some embodiments, hierarchical action models are used to define tasking cues relative to the workflow ontologies that are defined.

The output from the reasoning module 110 is input to the augmented reality generator 112 and the speech generator 114. The AR generator 112 created display content that takes the world model and user perspective from the sensors 1031 to 103n into account, i.e., task ontologies, next steps, display instructions, apparatus overlays, and the like, are modeled over the three-dimensional model of a scene stored in database 108 according to the user's perspective, as described in pending U.S. patent application Ser. No. 13/378,512, filed Sep. 1, 2010 and pending U.S. patent application Ser. No. 13/314,965, filed Dec. 8, 2011, both incorporated by reference in their entireties herein. The AR generator 112 updates the display the user sees in real-time as the user performs tasks, completes, tasks, goals, moves on to different tasks, and transitions from one environment to the next.

The speech generator 114 creates contextual dependent verbal cues in the form of responses to the user indicating the accuracy of the user's actions, next steps, related tips, and the like. The output from the AR generator 112 and the speech generator 114 are synchronized to ensure that a user's experience is fluent and fully realized as an interactive training, or mentoring, environment.

In addition, the performance module 120 actively analyzes the user's performance in following task ontologies, completing workflows, goals, and the like. The performance module 120 can then also output display updates and audio updates to the AR generator 112 and the speech generator 114. The performance module 120 also interprets user actions against the task the user is attempting to accomplish. This, in turn, feeds the reasoning module 110 on next actions or verbal cues to present to the user.

Figure 2:
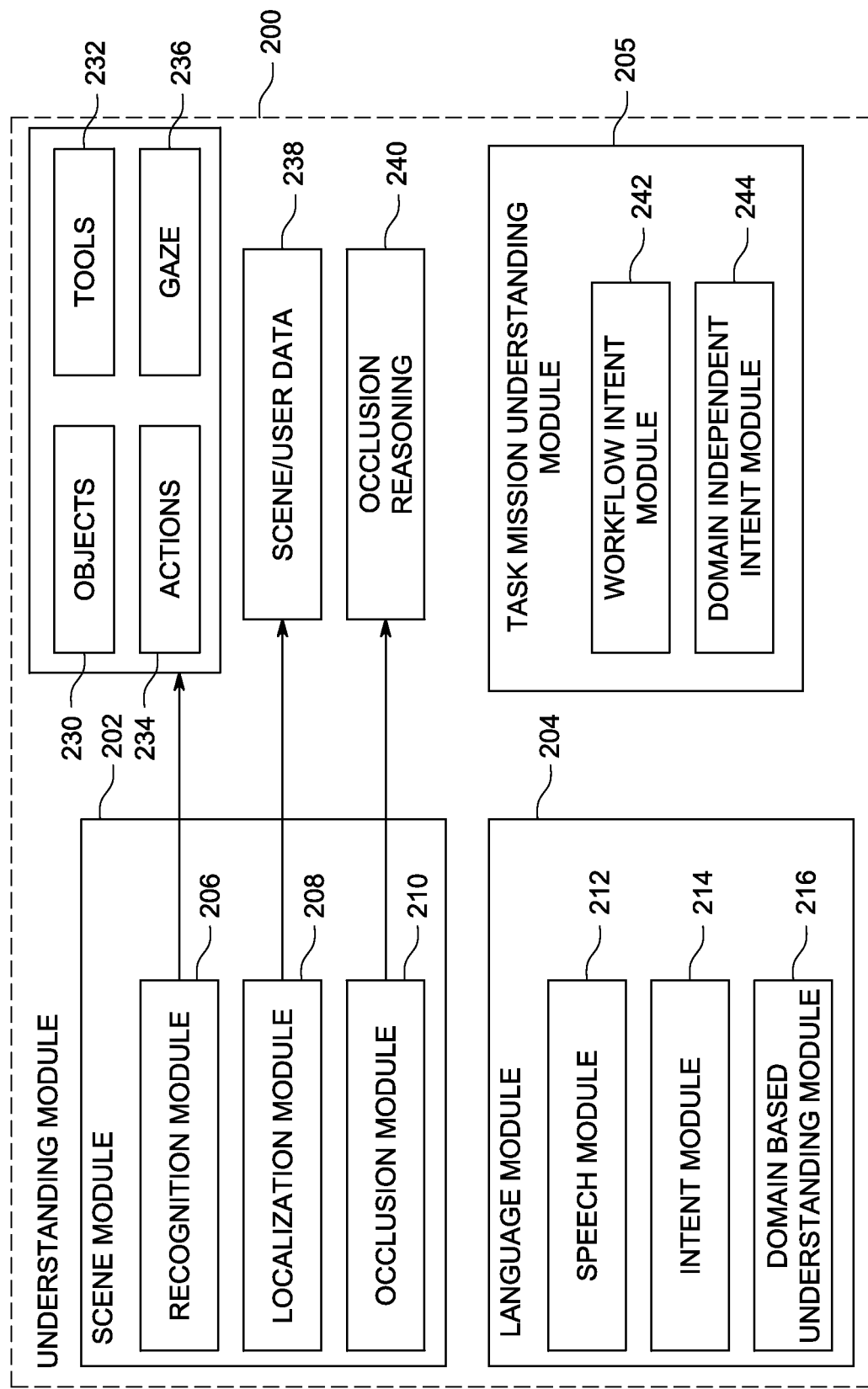
FIG. 2 depicts a functional block diagram of the understanding module in accordance with exemplary embodiments of the present invention.

FIG. 2 depicts a block diagram of the understanding block 200 in accordance with exemplary embodiments of the present invention. The understanding block 200 is comprised of the scene module 202, the language module 204 and the task mission understanding module 205.

The scene module 202 comprises a recognition module 206, a localization module 208 and an occlusion module 210. The recognition module 206 recognizes, for example objects 230, handheld (or otherwise) tools 232, users actions 234, user gaze 236, and the like.

The localization module 208 generates scene and user localization data 238 which precisely situates the user relative to the scene in FIG. 1 within six degrees of freedom. For mentoring applications, objects of interest (or the locale) are well defined. In such case the visual features of the object (or locale) can be extracted in advance for providing positioning with respect to the object in real-time. The localization module 208 performs Landmark matching/object recognition allowing for pre-building a landmark/object database of the objects/locales and using the database to define users' movements relative these objects/locales. Using a head-mounted sensory device such as a helmet, imagery and 3D data is collected to build 3D models and landmark databases of the objects of interest.

The video features provide high level of fidelity for precision localization that is not possible with a head-mounted IMU system alone. The localization method is based on an error-state Kalman filter algorithm using both relative (local) measurements obtained from image based motion estimation through visual odometry, and global measurements as a result of landmark/object matching through the pre-built visual landmark database. Exploiting the multiple-sensor data provides several layers of robustness to a mentoring system.

The occlusion module 210 generates occlusion reasoning 240, i.e., reasoning about objects being occluding and objects causing occlusion of other objects and determining depth based on the occlusions. In addition, the occlusion module 210 evaluates the three-dimensional perspective of the scene in FIG. 1 to evaluate distances and occlusion form the user's perspective to the scene objects 230.

According to some embodiments, the recognition module 206 uses the information generated by the localization module 208 to generate a model for user gaze 236 as well as the objects 230 and the tools 232 within the user's field of regard.

The language module 204 comprises a speech module 212, an intent module 214 and a domain based understanding module 216. The speech module 212 recognizes a user's natural language speech. The intent module 214 determines a user's intent based on statistical classifications. The understanding module 216 performs, according to one embodiment, domain specific rule based understanding.

The speech module 212 converts speech to text and can be customized to a specific domain by developing the language and acoustic models, such as those described in "A Unified Framework for Constructing Multimodal Experiments and Applications", Cheyer, Julia and Martin, herein incorporated by reference in its entirety. Automatic Speech Recognition (ASR) is based on developing models for a large-vocabulary continuous-speech recognition (LVCSR) system that integrates a hierarchy of information at linguistic, phonetic, and acoustic levels. ASR supports natural, spontaneous speech interactions driven by the user needs and intents. This capability contrasts with most interactive voice response (IVR) systems where the system directs the dialogue, and the user is constrained to a maze of questions and limited answers. In addition, ASR can also support speaker-independent spontaneous speech when the topic of the conversation is bounded to a specific domain.

The intent module 214 uses statistics of large amounts of vocabulary and data and a sophisticated statistical model to characterize and distinguish the acoustic realization of the sounds of a language, and to accurately discriminate among a very large set of words (this statistical model is known as the "acoustic model"). ASR also uses a second statistical model to characterize the probabilities of how words can be combined with each other. This second model is referred to as the "language model". More technically, the language model specifies the prior probability of word sequences based on the use of N-gram probabilities. For the resulting application to perform optimally, the training data must be as representative as possible of the actual data that would be seen in the real system operation. This in-domain data is necessary in addition to publicly available, out-of-domain data that can be used to complement the training of the needed statistical models.

The domain based understanding module (DBUM) 216 component is responsible for transforming the user's utterance in natural language, using speech input in this proposal, into a machine-readable semantic representation of the user's goal. Natural Language Understanding (NLU) tasks can be divided into sub-components: 1) Event/intent classification: Determine the user goal in a given utterance and 2) Argument extraction: Determine the set of arguments associated with the user goal. Human language expresses meaning through various surface forms (e.g., prosody, lexical choice, and syntax), and the same meaning can be expressed in many different surface forms.

These aspects are further accentuated in conversational systems, in which the dialogue context plays a significant role in an utterance's meaning. Another aspect that is particularly important for spoken language understanding (SLU) is robustness to noise in the input. Unlike that of text understanding, the input to SLU is noisy because it is the output of a speech recognizer. In addition to this noise, spoken language is rampant with disfluencies, such as filled pauses, false starts, repairs, and edits. Hence, in order to be robust, the SLU architecture needs to cope with the noisy input from the beginning and not as an afterthought. Also, the meaning representation supports robust inference even in the presence of noise.

The DBUM 216 employs the high-precision rule-based system to get intent and arguments of the user's request and use the statistical system of the intent module 214 only if needed (e.g., when user utterance cannot be parsed by the rule-based system or the intent is found ambiguous by the rule-based parser). As the coverage and accuracy of the statistical system increases with more in-domain data, we will switch to a more complicated combination approach where the rule-based system and the statistical system will be weighed based on the parser confidences, using different weighting schemes.

The task mission understanding module (TMUM) 205 further comprises a workflow intent module 242 and a domain independent intent module 244. The task mission understanding module 205 interprets semantic frames which encodes the language and scene based representations against a workflow and its current state to determine user intent.

Figure 3:
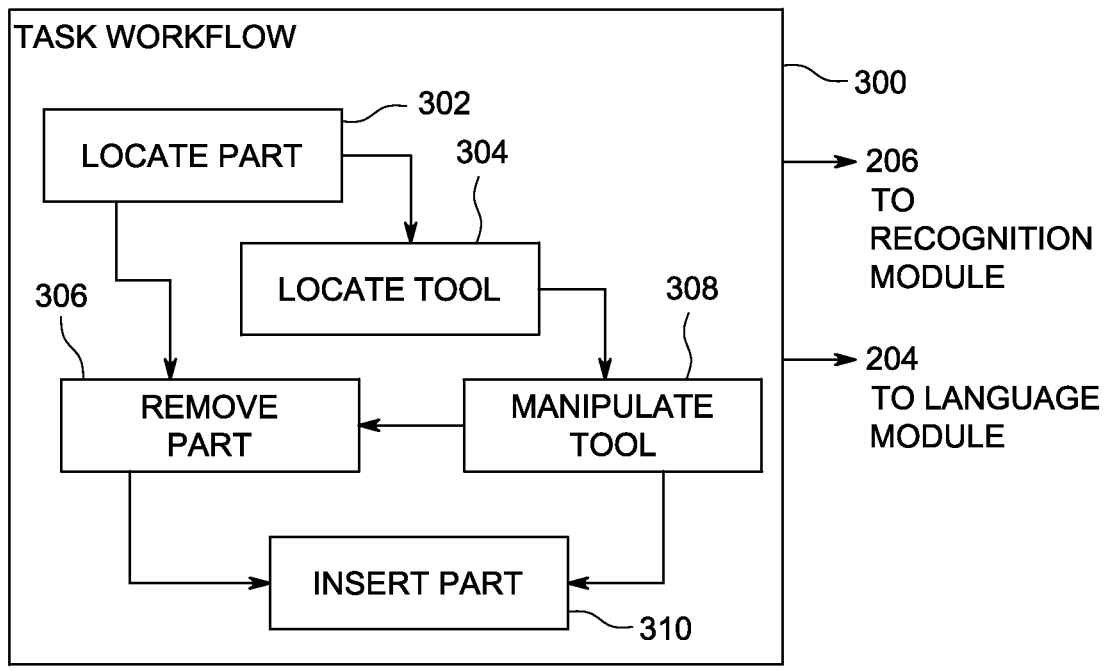
FIG. 3 depicts an example task workflow in accordance with exemplary embodiments of the present invention.

The joint intent is formulated and relevant attributes that are associated with that intent are extracted and sent to the reasoning system. An example workflow is shown in FIG. 3 where an initial task is to "locate part" 302, i.e. locate a machine part. The next step in the workflow can either be "locate tool 304" or "remove part 306". The workflow also contains the steps of "manipulate tool" 308 and "insert part 306" according to exemplary embodiments of the present invention. Workflow 300 is merely a sample workflow and many other workflows are storable in the present invention.

The TMUM 205 is responsible for recognizing/interpreting user goals in a given state or context. The scene module 202 and language module 204 described above provide partial information about what the user is trying to do at a given time but usually individual components do not have access to all the information required to determine user goals. The primary objective of the TMUM 205 is to merge pieces of information coming from different components, such as scene understanding and language understanding in this case, as well as information that is coming from previous interactions, i.e., context/state information.

For example, the user might look at a particular object and say "where do I put this?" The scene module 202 identifies the location of objects in the scene and direction that the user is looking at (e.g., a screwdriver), and the language module 204 identifies that the user is asking a question to locate the new position of an object but neither component has a complete understanding of user's real goal. By merging information generated by individual modules, the system will determine that the user is "asking a question to locate the new position of a specific screwdriver".

Furthermore, most of the time, it is not enough to understand only what the user said in the last utterance but also important to interpret that utterance in a given context of recent speech and scene feeds. In the running example, depending on the task the user is trying to complete, the question in the utterance might be referring to a "location for storing the screwdriver" or a "location for inserting the screwdriver into another object."

The task/missing understanding component in this application merges three different semantic frames representing three different sources of information at any given time: 1. Semantic frame representing the scene (from the scene module 202), 2. Semantic frame extracted from the last user utterance (from the language module 204), 3. Semantic frame that represents the overall user goal up to that point (from prior interactions). The TMU 205 can also utilize useful information about the user's history and characteristics to augment the context information, which could enable adapting and customizing the user interaction.

Merging of these three pieces of information is accomplished using a hybrid approach that consists of: 1. A domain-independent unification mechanism that relies on an ontology structure that represents the events/intents in the domain and 2. Task-specific workflows using a workflow execution engine.

Figure 4:
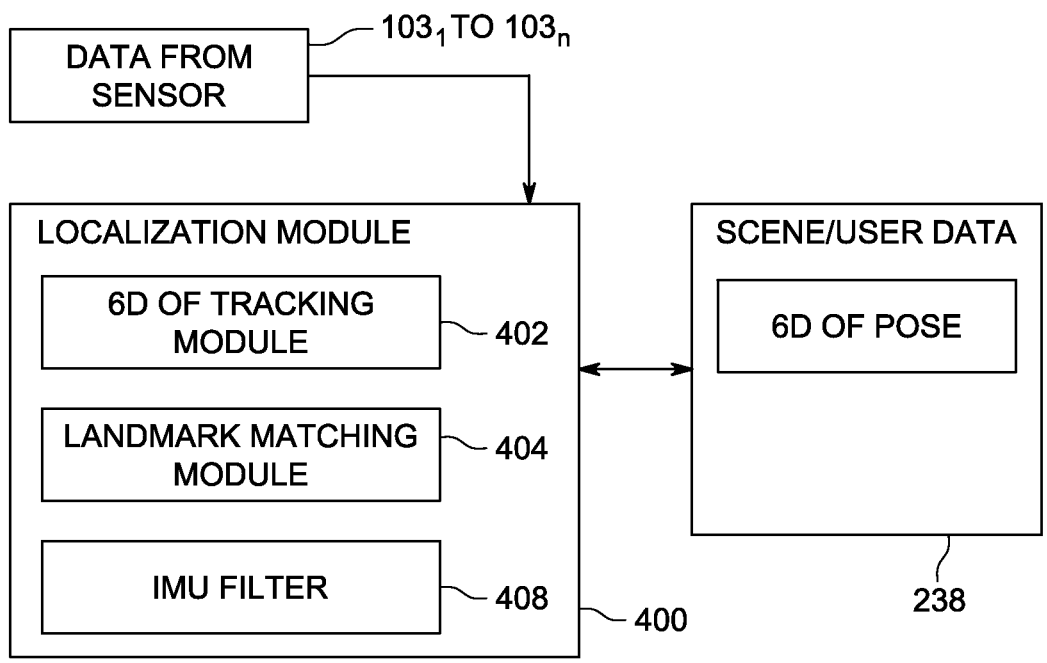
FIG. 4 is a block diagram of the localization module in accordance with embodiments of the present invention.

FIG. 4 is a block diagram of the localization module 400 in accordance with embodiments of the present invention. According to some embodiments, sensor data from sensors 103₁ to 103n includes video data, GPS data, and inertial measurement unit (IMU) data, amongst others. The localization module 400 takes the data as input and outputs scene and user data 238, which is comprised a 6 degree of freedom (6DOF) pose. The localization module 400 comprises a 6DOF tracking module 402, a landmark matching module 404 and an IMU filter 408. Localization module 400 is fully described in commonly assigned, issued U.S. Pat. No. 7,925,049 for "Stereo-based visual odometry method and system", filed on Aug. 3, 2007, U.S. Pat. No. 8,174,568 for "Unified framework for precise vision-aided navigation" filed on Dec. 3, 2007, and U.S. Patent Application Publication Number 20100103196 for "SYSTEM AND METHOD FOR GENERATING A MIXED REALITY ENVIRONMENT", filed on Oct. 27, 2007, which are hereby incorporated by reference in their entirety.

Figure 5:
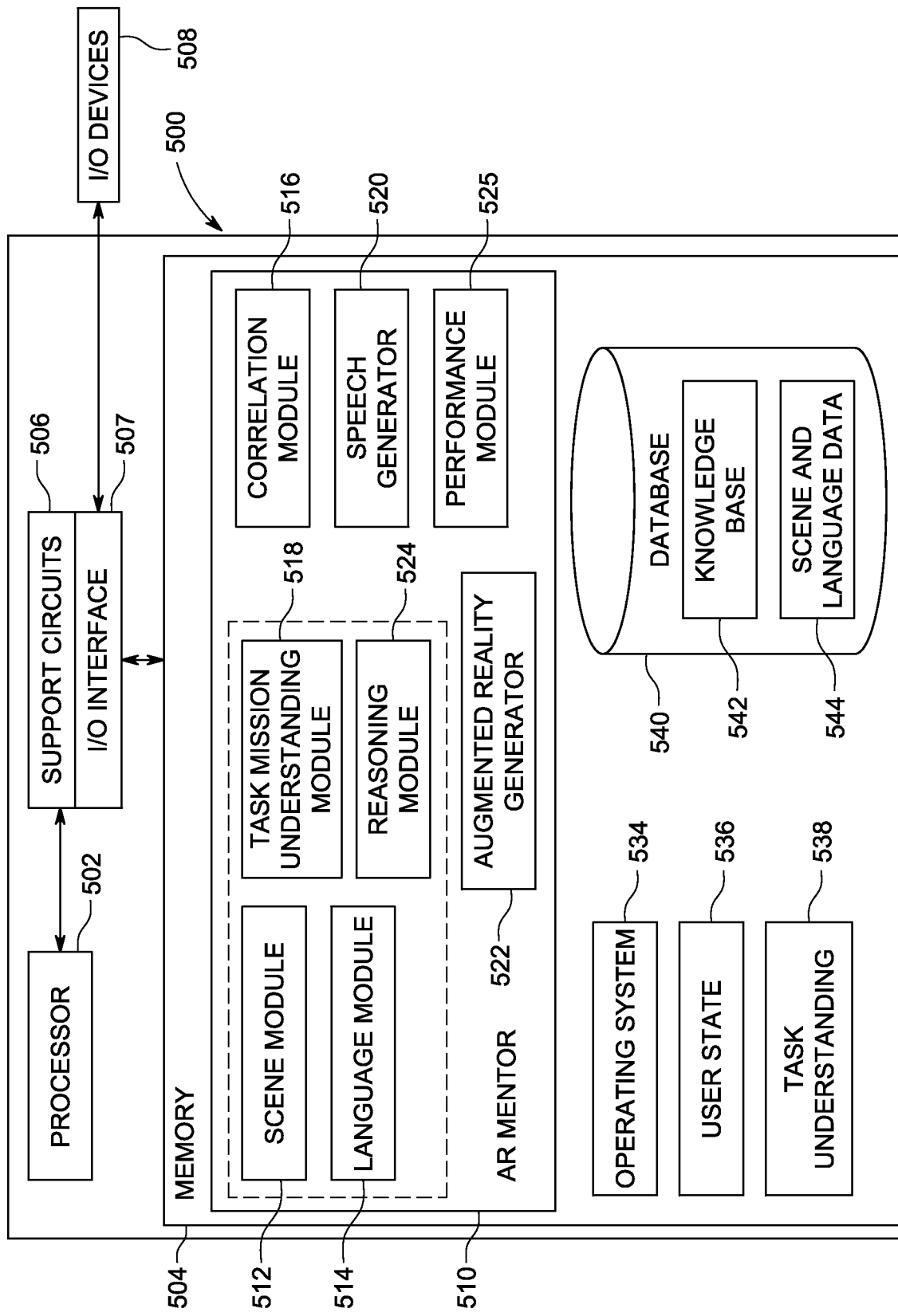
FIG. 5 depicts an implementation of the AR mentor of FIG. 1 by a computer system in accordance with at least one embodiment of the present invention.

FIG. 5 depicts an implementation of the AR mentor 100 of FIG. 1 by the computer 500 in accordance with at least one embodiment of the present invention. In some embodiments, AR mentor 100 may be implemented using a plurality of such computers, for example a group of servers. The computer 500 includes a processor 502, various support circuits 506, and memory 504. The processor 502 may include one or more microprocessors known in the art. The support circuits 506 for the processor 502 include conventional cache, power supplies, clock circuits, data registers, I/O interface 507, and the like. The I/O interface 507 may be directly coupled to the memory 504 or coupled through the supporting circuits 506. The I/O interface 507 may also be configured for communication with input devices and/or output devices such as network devices, various storage devices, mouse, keyboard, display, video and audio sensors, IMU and the like.

The memory 504, or computer readable medium, stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise an AR mentor 510.

As described below, in an exemplary embodiment, the AR mentor module 510 comprises a scene module 512, a language module 514, a correlation module 516, a task mission understanding module 518, a speech generator 520, an augmented reality generator 522, a reasoning module 524 and a performance module 525. The memory 504 also stores user state 536, task understanding 538 and a database 540, comprising a knowledge base 542 and scene and language data 544.

The computer 500 may be programmed with one or more operating systems (generally referred to as operating system (OS) 534), which may include OS/2, Java Virtual Machine, Linux, SOLARIS, UNIX, HPUX, AIX, WINDOWS, WINDOWS95, WINDOWS98, WINDOWS NT, AND WINDOWS2000, WINDOWS ME, WINDOWS XP, WINDOWS SERVER, WINDOWS 8, IOS, ANDROID among other known platforms. At least a portion of the operating system 534 may be disposed in the memory 504.

The memory 504 may include one or more of the following random access memory, read only memory, magneto-resistive read/write memory, optical read/write memory, cache memory, magnetic read/write memory, and the like, as well as signal-bearing media as described below.

Figure 6:
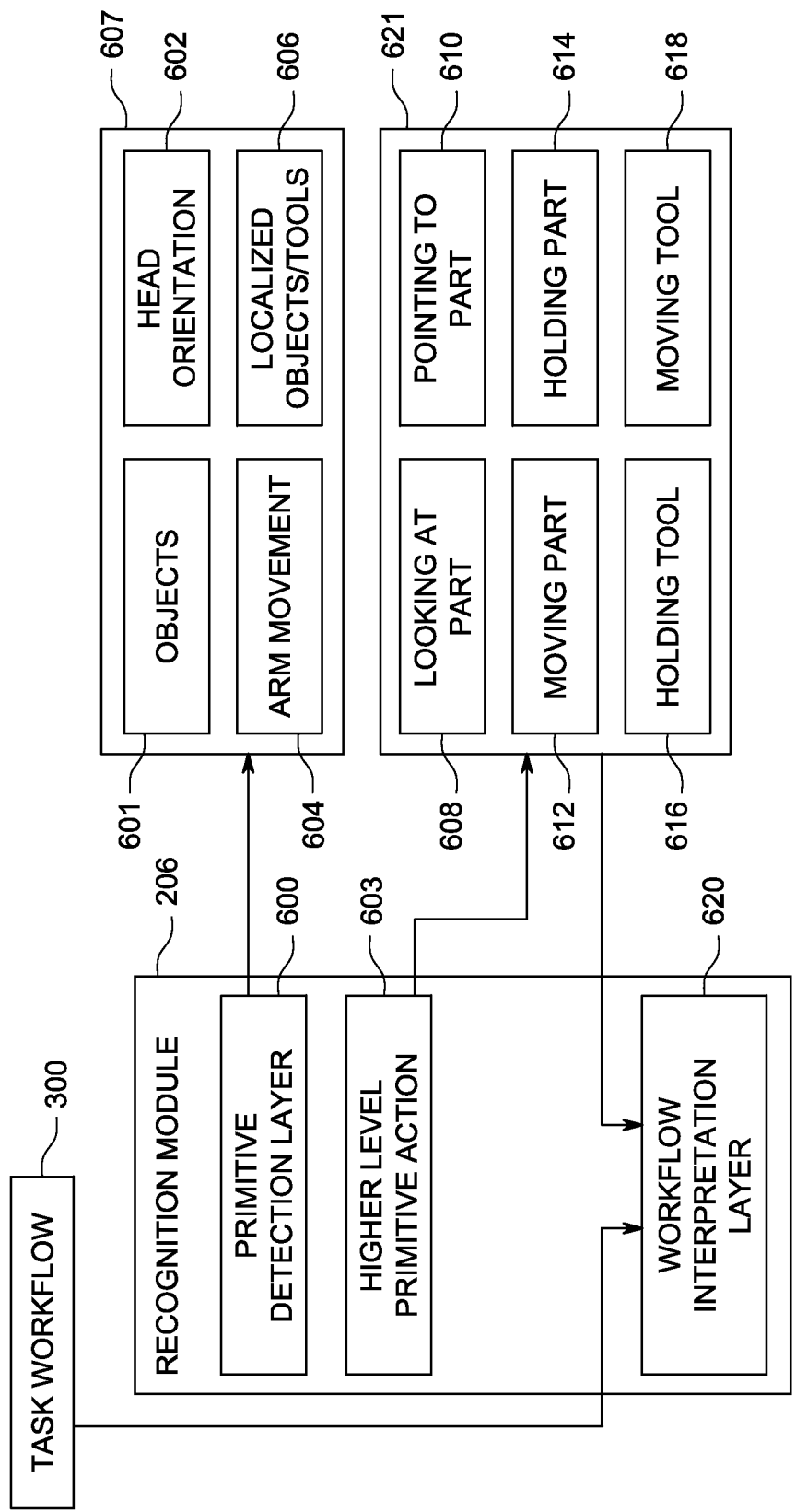
FIG. 6 depicts a detailed view of the recognition module in accordance with exemplary embodiments of the present invention.

FIG. 6 depicts a detailed view of the recognition module 206 in accordance with exemplary embodiments of the present invention. The recognition module comprises two layers of object recognition: the primitives detection layer 600 and the higher level primitive action layer 603.

According to some embodiments, the primitives detection layer 600, scene localization 606 is first used to first establish objects 601 and head orientation 602 in the world (or local scene 153 as shown in FIG. 1). Additionally depth and optical flow based reasoning is used to locate dynamic components; for example, general movement of the arms within field of regard 604. In the higher level primitive action layer, the primitives 607 are combined to identify higher level action primitives 621 that are observed. According to some embodiments of the present invention, support vector machines are used to classify such actions using the primitive detections from the first layer.

For example, actions such as "looking at part 608", "pointing to part 610", "holding tool 616", "moving part 612", "holding part 614", and "moving tool 618" are classified using the primitives detected by the primitive detection layer 600. The third layer, the workflow interpretation layer 620, interprets the action primitives 621 against a context specific workflow model (e.g., task workflow 300 as shown in FIG. 3) and the current context within this model to identify new workflow states and transitions.

According to some embodiments, Hidden Markov Models (HMM) are used to model the transitions of the finite-state machine that represents the task workflow 300. Associated output information (called scene-based semantic frames) from the workflow interpretation layer 620 is passed to the task mission understanding module 106 for fusion with language based cues. By limiting the object recognition to the world model of interest (of equipment being handled, for example) and knowing orientation and location of the world model relative to the user allows parts of interest to be tracked through the operations of the AR mentor 100. Similarly by evaluating actions in the context of the task workflow 300 using the workflow interpretation layer 620, allows us to develop more reliable detections.

Figure 7:
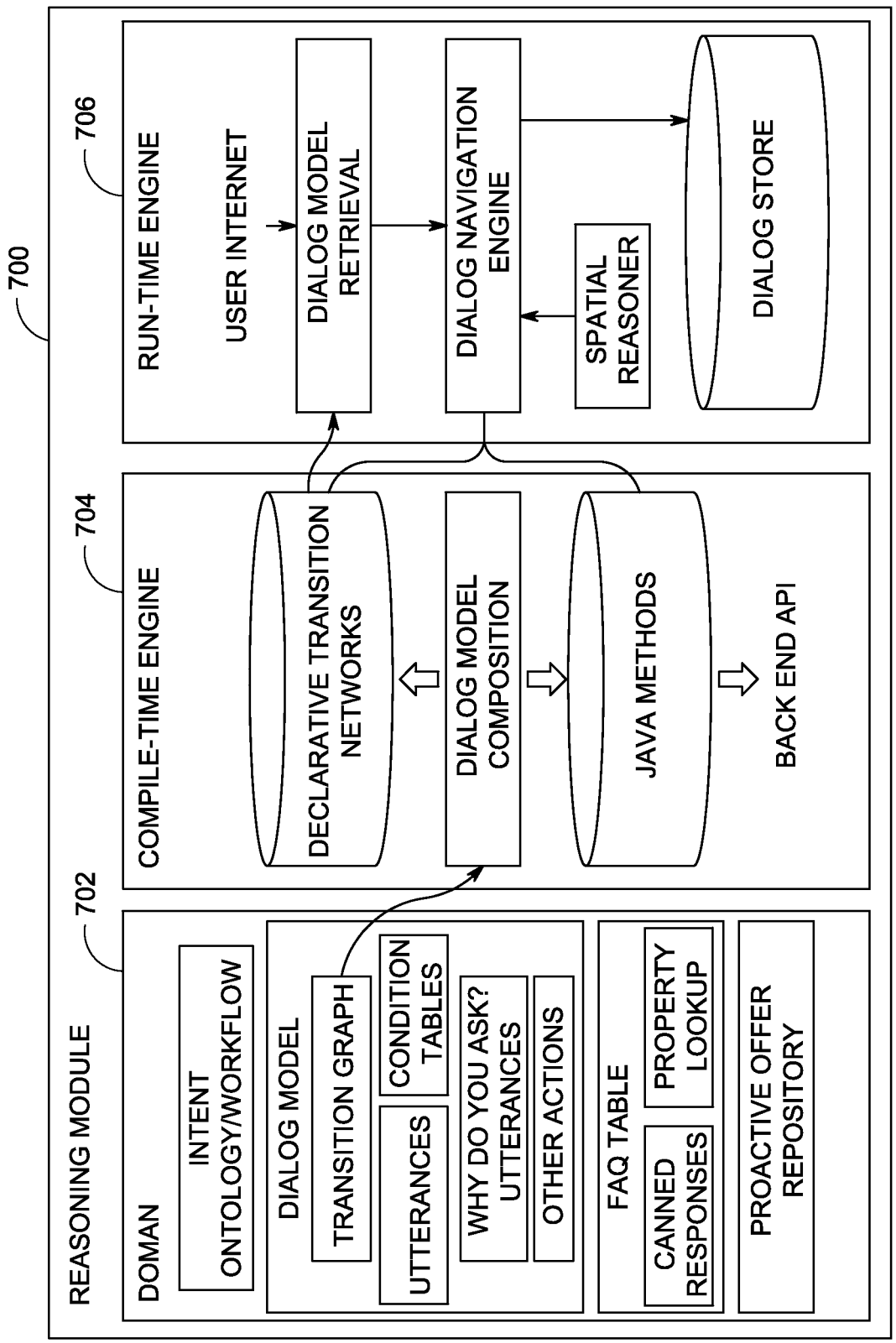
FIG. 7 is a detailed depiction of the reasoning module in FIG. 1 shown as reasoning module 700 in accordance with exemplary embodiments of the present invention.

FIG. 7 is a detailed depiction of the reasoning module 110 in FIG. 1 shown as reasoning module 700 in accordance with exemplary embodiments of the present invention. The reasoning module 700 receives the detailed representation of the user's current state and goals as inputs, as determined by the TMUM 106 and produces a representation of an appropriate response, where the response may be audio dialog, UI displays, or some combination of the two according to one embodiment.

The reasoning module 700 requires detailed domain knowledge to ensure that the AR mentor 100 responds correctly and takes appropriate action from a domain perspective, and that these responses and actions instill trust in the user of the AR mentor 100. Reasoning must calculate the next response or action of the AR mentor 100 using a variety of diverse sources: detailed knowledge of the domain's procedures and preferred styles of interaction; known information about the user, including their level of expertise in the domain; and the status of the context of the dialog with the user this far.

The detailed architecture of the existing reasoning module 700 is shown in FIG. 7. The architecture facilitates the acquisition of multifaceted domain knowledge 702 designed to drive user-system dialogs and interactions covering a wide variety of topics within the domain. This knowledge is then compiled by an engine 704 into machine-interpretable workflows along with (if necessary) a set of methods that interact with domain back-end systems—retrieving information from legacy databases, etc. Then at run time, the run-time engine 706 uses those compiled workflows to interpret user intents received from the understanding module 123 and determines the next step for the AR mentor 100 to take.

This step is represented as an AR mentor "Intent", and may encode dialog for the speech generator 114 to generate, actions or changes within the UI, both of those, or even neither of those (i.e., take no action). The reasoning module 700 acquires, designs and en-codes the domain knowledge for user interaction in the task's chosen domain. This includes identifying and designing all possible user Intents and AR-Mentor Intents for the portion of the domain covered, designing dialogs that anticipate a wide variety of possible conditions and user responses, and developing APIs for any domain back end systems used in our system.

The reasoning module 700 tracks certain events being observed in a heads-up display, determines the best modality to communicate a concept to the user of the heads-up display, dynamically composes multimodal (UI and language) "utterances", manages the amount of dialog vs. the amount of display changes in the interaction, and the like. According to one embodiment, AR mentor "Intents" also accommodate robust representation of a variety of events recognized by the recognition module 206 shown in FIG. 2, and incorporates a spatial reasoning plug-in specifically to develop dialog based on user perspective and object placements in the world. According to another embodiment, the reasoning module 700 estimates the information value to the user of various types and modalities of output to determine coherent and synchronous audio-visual feedback.

The reasoning module 700 will further initiate dialogs based on exogenous events ("exogenous" in the sense that they occur outside the user-mentor dialog), which may include the AR mentor 100's current assessment of an ongoing operation/maintenance process it is monitoring by extending a "proactive offer" functionality, and enhance the representation of the input it uses to make next-step decisions. The reasoning module is further described in commonly assigned and co-pending U.S. patent application Ser. No. 13/314,965, filed Dec. 8, 2011, which is hereby incorporated in its entirety herein.

Figure 8:
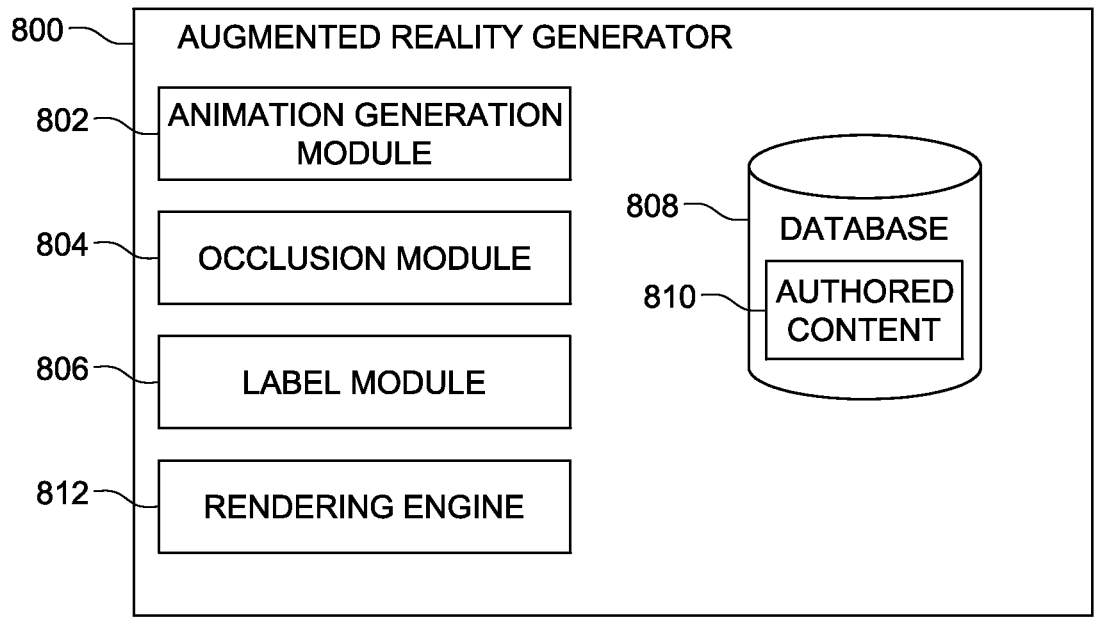
FIG. 8 is a detailed depiction of the AR generator of FIG. 1 in accordance with exemplary embodiments of the present invention.

FIG. 8 is a detailed depiction of the AR generator 112 of Figure as AR generator 800. The AR generator 800 uses computed head poses to accurately render animations and instructions on a user display, for example, AR goggles, so that the rendered objects and effects appear as if they are part of the scene. The AR generator 800 provides low-lag realistic overlays that match precisely with a real-world scene.

The AR generator 800 relies on the localization module 208 of the scene module 202 as shown in FIG. 2 to obtain an accurate head pose. The generated pose accounts for delays in the video processing and rendering latencies to make the overlays correctly appear in the world scene. The animation generation module 802 asks the localization module 208 to predict a pose just-in-time for rendering to a display. On such request the localization modules 208 uses a Kalman Filter to exploit the high-rate IMU input to accurately predict the location and orientation of a user's head in approximately 5-10 msec, in one embodiment.

The occlusion module 804 works with dynamic depth maps in its rendering pipeline. The dynamic depth that is obtained from the scene module 202 in FIG. 2 is fused with information from computer aided drawing models (for the scene or objects) that are available to create consistent occlusion masks for rendering to the display. This ensures correct 3D layering between the rendered objects against the real-world scene. The AR generator 800 further comprises a label module 806 for labeling objects in the scene and organizing these labels on the rendered view.

The animation generator 800 relies upon a well-organized pre-authored domain specific content stored in database 808 to enable intuitive instructions. The authored content 810 is organized hierarchically and incorporated within the logic of the reasoning module 110 to ensure intuitive triggering of these scripts. Based on these higher level instructions, a rendering engine 812 will sequence through lower-level set of animations and visualizations with intuitive transitions.

Figure 9:
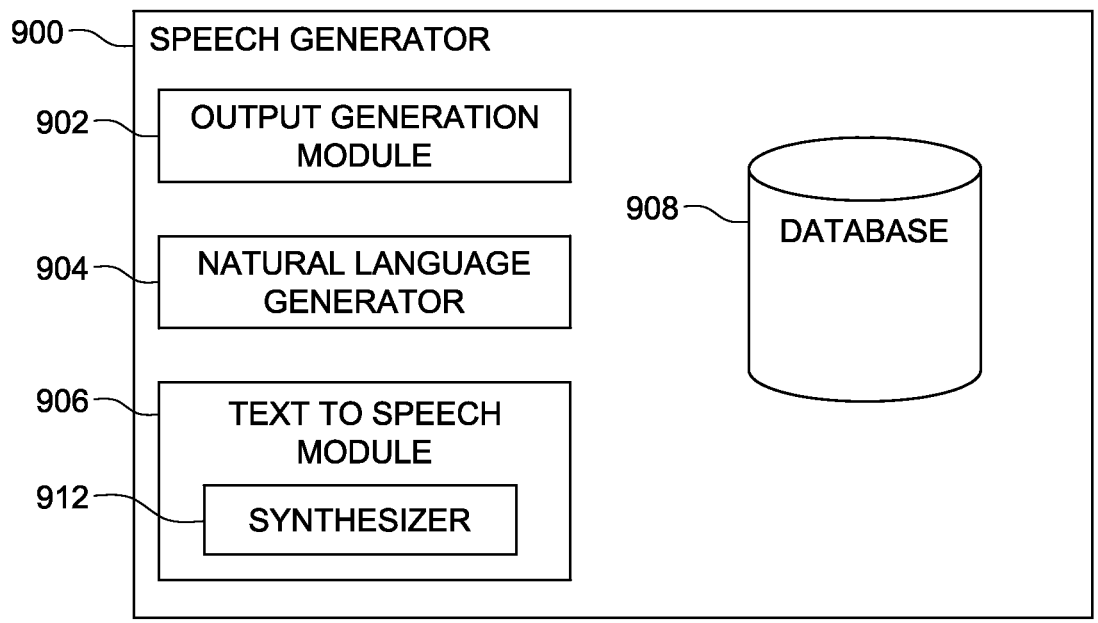
FIG. 9 depicts a detailed view of the speech generator of FIG. 1 in accordance with embodiments of the present invention.

FIG. 9 depicts a detailed view of the speech generator 114 as speech generator 900 in accordance with embodiments of the present invention. The speech generator 900 comprises an output generator 902, a natural language generator (NLG) 904 and a text to speech module 906.

The output generation module 902 receives input from the reasoning module 700 shown in FIG. 7 such as actions and converts them into different forms of action representations such as text, speech, domain specific actions, and UI manipulations, as appropriate for the user and the environment.

The NLG 904 employs hierarchical output templates with fixed and optionally variable portions that are generated on the fly using linguistic tools to generate system responses in a given interaction with the user. Each action generated by the reasoning module 700 has an associated prompt template, and the system chooses the most appropriate response by synthesizing the variable portion of the response.

The responses from the NLG 904 are customized according to the user as well as the state of the simulated interaction, i.e., the training, repair operation, maintenance, etc. The speech generator 900 optionally can take advantage of external speech cues, language cues and other cues coming from the scene to customize the responses. In various cases, NLG module 904 leverages visual systems such as AR and a user interface on a display to provide the most natural response. As an example, the NLG 904 may output "Here is the specific component" and use the AR generator 800 to show the component location with an overlaid arrow rather than verbally describing the location of that component.

The text to speech module 906 converts output text to speech, so that an answer from the reasoning module 700 can be played back as audio to the user. The text to speech module 906 uses selection concatenative synthesis. This approach uses a large database 908 of prerecorded and segmented speech from one speaker. The database 908 is created by segmenting each utterance into multiple units of different length, such as phones, diphones, syllables, morphemes, words and phrases.

To generate an arbitrary output, the synthesizer 912 determines the best chain of candidate units from the database 908 in a process known as unit selection. The chosen segments are smoothly concatenated and played back. Unit selection synthesis offers high level natural speech, mostly when the text to synthesize can be covered by sets of longer units. According to one embodiment, the text to speech module 806 is implemented using the TTS product from NEOSPEECH.

Figure 10:
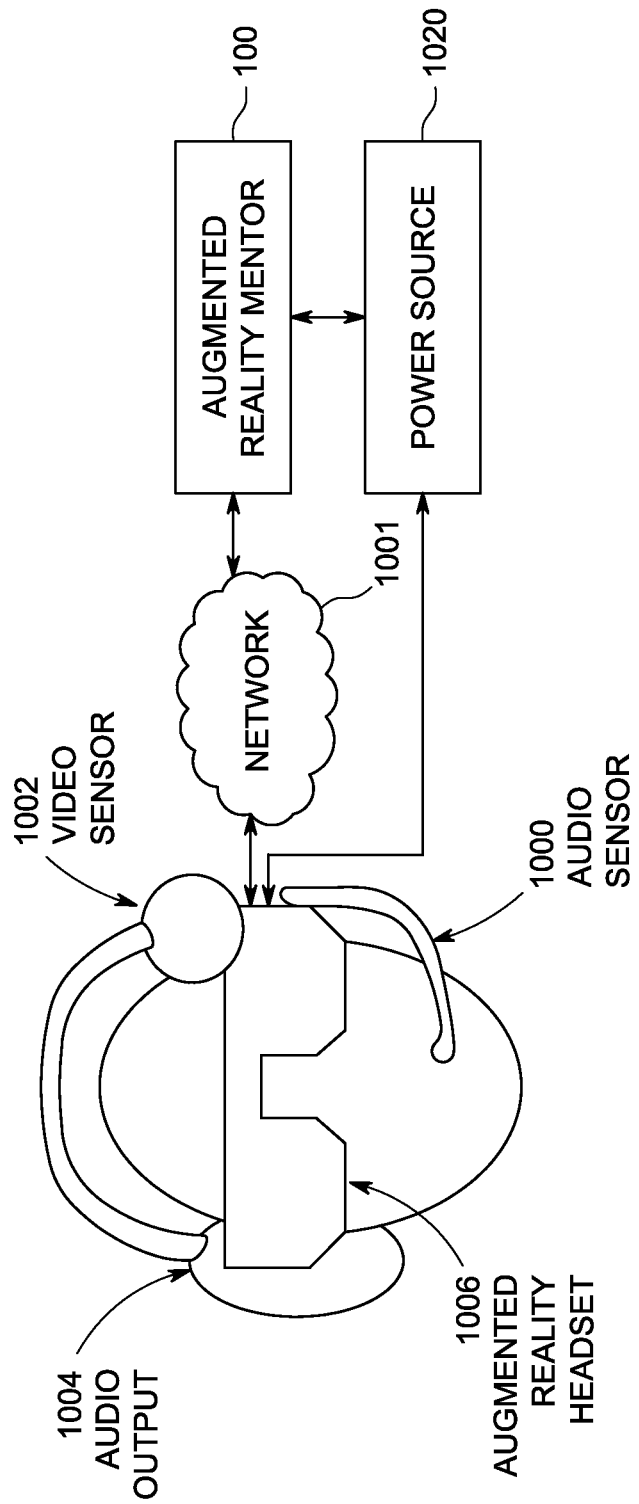
FIG. 10 illustrates an AR mentor of FIG. 1 in accordance with at least one exemplary embodiment of the present invention.

FIG. 10 illustrates an AR mentor of FIG. 1 in accordance with at least one exemplary embodiment of the present invention. The AR mentor 100 is coupled to an AR headset 1006 over a network 1001. In other embodiments, the AR mentor 100 is directly communicatively coupled to the AR headset 1006. The AR headset 1006 is coupled to a video sensor 1002, an audio sensor 1000m and an audio output 1004.

The video sensor 1002 and the audio sensor 1000 serve as a portion of the sensors $103_1$ to $103_n$. The AR headset 1006 also comprises an IMU unit which is not shown. The AR headset 1006 is used by the AR mentor 100 to both sense the environment using audio, visual and inertial measurements and to output guidance to the user through natural language spoken dialogue through the audio output 1004, headphones, and visual cues augmented on the user's head mounted display, thee headset 1006. The wearable system provides for a heads-up, hands-free unencumbered interface so that the user is able to observe and manipulate the objects in front of him freely and naturally.

According to some embodiments, clip on sensor packages are utilized to reduce weight. In some embodiments, the video sensor is an ultra-compact USB2.0 camera from XIMEA (MU9PC_HM) with high resolution and sensitivity for AR, with a 5.7×4.28 mm footprint. Alternatively, a stereo sensor and light-weight clip-on bar structure may be used for the camera. The IMU sensor may be an ultra-compact MEMs IMU (accelerometer, gyro) developed by INERTIAL LABS that also incorporates a 3 axis magnetometer. In an alternate embodiment, the XSENS MTI-G SENSOR, which incorporates a GPS, is used as the IMU sensor.

The headset 1006 may be a see-through display such as the INTEVAC I-PORT 75, or the IMMERSION INTERNATIONAL head mounted display with embedded speakers (HMD). According to some embodiments, the processor for running the AR mentor 100 is a compact sealed processor package incorporating a PC-104 form factor INTEL i-7 based computer, or a 4 core I-7 enclosed within a ruggedized sealed package. Alternatively, the AR mentor 100 can be deployed on a smart tablet or smart phone, and can communicate with the headset 1006 through the network 1001 or a direct coupling. Further, smart devices often come with audio, video, IMU, and GPS sensors built in. In other embodiments, the generated AR can be shown through a wall mounted or table mounted display along with speaker systems, where cameras and microphones are set up in a room to provide an AR mentoring experience. The power source 1020 may be a battery pack designed to fit a military style vest with MOLE straps according to one embodiment.

Figure 11:
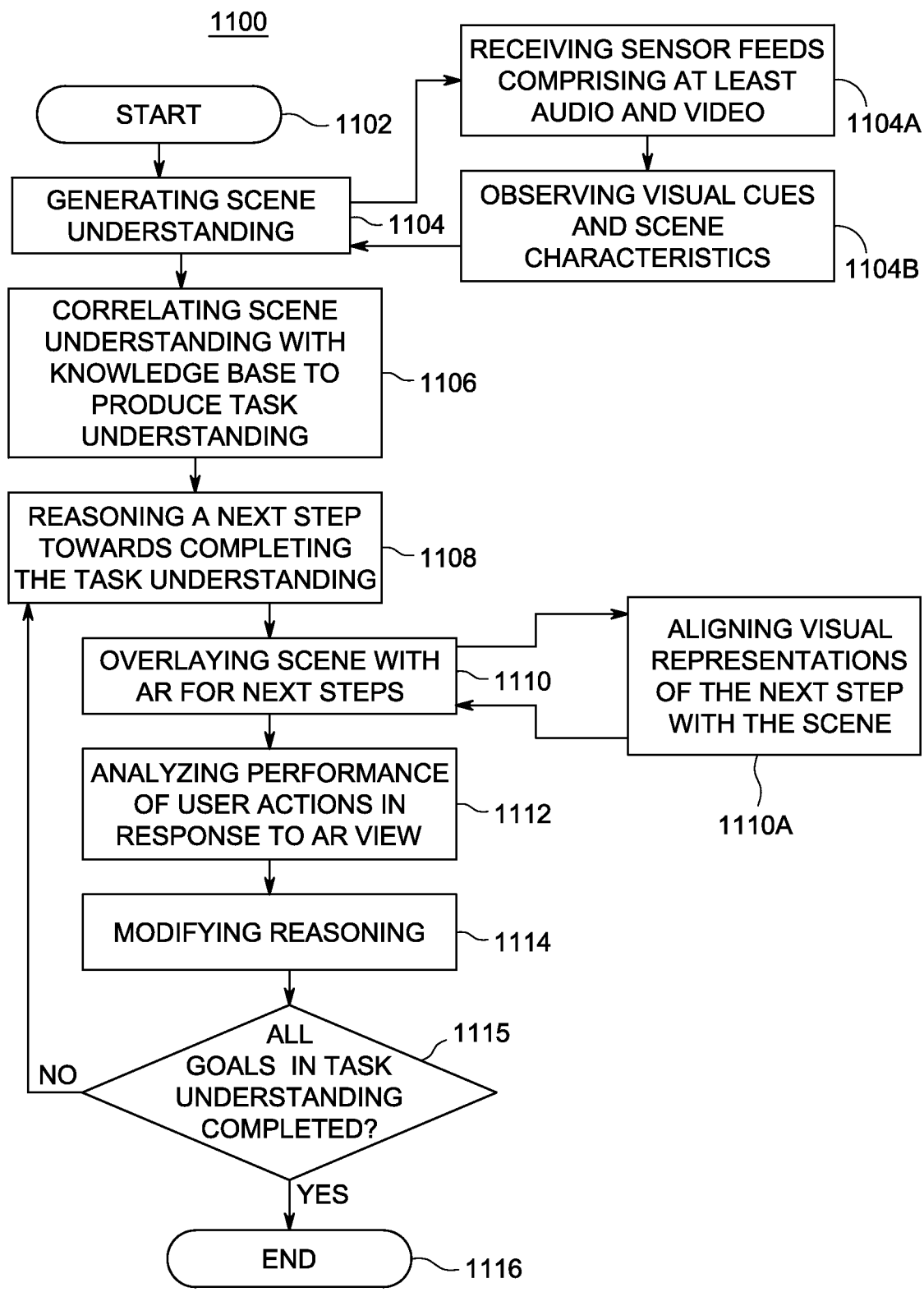
FIG. 11 depicts a flow diagram of a method 1100 for training users in accordance with embodiments of the present invention.

FIG. 11 depicts a flow diagram of a method 1100 for training users in accordance with embodiments of the present invention. The method 1100 is an implementation of the AR mentor 510 as executed by the processor 502 by the computer system 500 as shown in FIG. 5.

The method begins at step 1102 and proceeds to step 1104. At step 1104, a scene understanding is generated by the understanding module 571 based on video and audio input of a scene of a user performing a task in a scene, recorded or captured by a video sensing device such as video sensor 1002 and audio sensor 1000 as shown in FIG. 10.

At sub-step 1104A, the AR mentor 510 receives sensor feeds of at least audio and video, and may optionally receive GPS data, IMU data, and other localization or pose data to improve AR functionality. The scene module 512 recognizes objects and movement in the scene and the language module 514 recognizes natural language being spoken in the audio as well as a set of preconfigured commands. The method then proceeds to step 1104B, where the scene module 512 observes visual cues such as particular hand movements, gestures, movement of a device, and the like, and scene characteristics, such as time of day, location, and the like.

The method then proceeds to step 1106, where the correlation module 516 correlates the scene understanding with a knowledge base which is stored either on a database or some form of storage, to produce a task understanding. The knowledge base may include repair and maintenance instructions for a multitude of vehicles, machines, or the like, or in some embodiments the knowledge base may contain training information for training users in weapons handling, exercise routines, or the like.

At step 1108, the reasoning module 524 reasons a next step towards completing one or more goals in the produced task understanding. The task understanding may be of a compound task which has multiple goals and sub-goals. According to some embodiments, the reasoning module 524 determines which goal or sub-goal has priority in completion and reasons a next step based on the priority.

The method proceeds to step 1110, where the AR generator 522 overlays the scene with AR visualizations or text for what the next steps are determined to be. At sub-step 1110A, visual representations of the next steps are aligned with the scene according to, for example, user pose from an IMU or the like.

The method then proceeds to step 1112, where once the user has performed the next step visualized by the AR generator 522, the performance module 525 analyzes the user's performance of the step and overall performance of the task represented by the task understanding. The performance module determines a level of the user's performance and modifies the reasoning a next step at step 1114.

The AR mentor 510 determines whether all goals in the task understanding are completed, and if they are, the method terminates at step 1116. If the goals have not all been completed, the method proceeds to earlier step 1108 and continues onwards until all goals are completed, or the user terminates the activity.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A computer-implemented method for utilizing augmented reality to assist a user in performing a real-world task comprising:
    generating a scene understanding based on an automated analysis of a video input and an audio input, the video input comprising a view of the user of a real-world scene during performance of a task, the audio input comprising speech of the user during performance of the task, and the automated analysis further comprising identifying an object in the real-world scene, extracting one or more visual cues to situate the user in relation to the identified object, wherein the user is situated by tracking a head orientation of the user;
    correlating the scene understanding with a knowledge database comprising at least data relating to models of respective procedures of different tasks to create a task understanding of the task in the scene understanding, wherein the task understanding comprises a set of goals relating to performance of the task in the scene understanding;
    processing the task understanding along with the models of respective procedures of the different tasks from the knowledge database to determine a next step of the task;
    generating a plurality of visual representations responsive to an ongoing interaction of the computer-implemented method with the user relating to the next step to achieve a goal;
    presenting the plurality of visual representations on a see-through display as an augmented overlay to the user's view of the real-world scene wherein the plurality of visual representations are rendered based on predicted head pose based on the tracked head orientation;
    guiding a user to perform the next step of the task during operation of the task via visual or audio output;
    analyzing actions of the user during the performance of the next task in response to the augmented overlay using the task understanding along with the models of respective procedures of the different tasks; and
    if the user has not completed all tasks, modifying or creating new visual representations to be generated and presented as an augmented overlay of a second next step of the task understanding.

2. The method of claim 1 further comprising:
    training a user to perform the task understanding as a training exercise.

3. The method of claim 1 wherein the visual representations of a next step of the task understanding are aligned with the real-world scene based on a pose of the user.

4. The method of claim 1 further comprising:
    analyzing the audio input to generate a language understanding based on natural language input in the audio input; and
    identifying one or more speakers in the audio input where a topic of conversation in the real-world scene is bounded to a specific domain.

5. The method of claim 4 further comprising:
    distinguishing acoustic realizations of sounds in the audio input using a statistical model to discriminate between a set of words.

6. The method of claim 5 further comprising:
    determining a goal of the user in a given utterance in the audio input; and
    extracting a set of arguments associated with the goal.

7. The method of claim 1 further comprising:
    producing the task understanding based on prior scene understanding information stored in the knowledge database and based on a semantic frame representing a user goal up to a current time.

8. The method of claim 1 further comprising:
    prioritizing among each of the goals in the set of goals for the task understanding; and
    suggesting a next step to the user towards completion of the real-world task, based on said prioritizing.

9. The method of claim 1, wherein at least one of the goals in the task understanding further comprises a set of subgoals.

10. An apparatus for utilizing augmented reality in assisting users in completing a complex physical task, the apparatus comprising:
    at least one processor;
    at least one input device; and
    at least one storage device storing processor-executable instructions which, when executed by the at least one processor, perform a method comprising:
    generating a scene understanding based on an automated analysis of a video input and an audio input, the video input comprising a view of the user of a real-world scene during performance of a task, the audio input comprising speech of the user during performance of the task, and the automated analysis further comprising identifying an object in the real-world scene, extracting one or more visual cues to situate the user in relation to the identified object, wherein the user is situated by tracking a head orientation of the user;
    correlating the scene understanding with a knowledge database comprising at least data relating to models of respective procedures of different tasks to create a task understanding of the task in the scene understanding, wherein the task understanding comprises a set of goals relating to performance of the task in the scene understanding;
    processing the task understanding along with the models of respective procedures of different tasks from the knowledge database to determine a next step of the task;
    generating a plurality of visual representations responsive to an ongoing interaction of the apparatus with the user relating to the next step to achieve a goal, wherein the plurality of visual representations are rendered based on predicted head pose based on the tracked head orientation;
    presenting the plurality of visual representations on a see-through display as an augmented overlay to the user's view of the real-world scene;
    analyzing actions of the user during the performance of the next task in response to the augmented overlay using the task understanding along with the models of respective procedures of the different tasks; and if the user has not completed all tasks, modifying or creating new visual representations to be generated and presented as an augmented overlay of a second next step of the task understanding.

11. The apparatus of claim 10 wherein generating a scene understanding comprises observing visual cues and scene characteristics to generate the scene understanding.

12. The apparatus of claim 10 wherein the method further aligns the visual representations of a next step in the set of goals with the real-world scene based on a pose of the user.

13. The apparatus of claim 10, wherein the method further comprises:
analyzing the audio input to generate a language understanding based on natural language input in the audio input; and
identifying one or more speakers in the audio input where a topic of conversation is bounded to a specific domain.

14. The apparatus of claim 13, wherein the method further comprises distinguishing acoustic realizations of sounds in the audio input using a statistical model to discriminate between a set of words.

15. The apparatus of claim 14, wherein the method further comprises:
determining a goal of the user in a given utterance in the audio input; and
extracting a set of arguments associated with the goal.

16. The apparatus of claim 10 wherein the method further comprises:
producing the task understanding based on prior scene understanding information stored in the knowledge database and a semantic frame representing a user goal up to a current time.

17. A computer-implemented method for utilizing augmented reality to assist a user in performing a real-world task, the method comprising:
generating a scene understanding based on an automated analysis of a video input and an audio input, the video input comprising a view of the user of a real-world scene during performance of the task, the audio input comprising speech of the user during performance of the task, and the automated analysis further comprising identifying an object in the real-world scene, extracting one or more visual cues to situate the user in relation to the identified object, wherein the user is situated by tracking a head orientation of the user;
correlating the scene understanding with a knowledge database comprising at least data relating to models of respective procedures of different tasks to create a task understanding of the task in the scene understanding, wherein the task understanding comprises a set of goals relating to performance of the task in the scene understanding;
generating a plurality of visual representations responsive to an ongoing interaction of the computer-implemented method with the user relating to the next step to achieve a goal, the ongoing interaction comprising at least audible interactions with the user based on natural language utterances interpreted from the speech received from the user, each of the visual representations relating one or more of the natural language utterances to one or more objects recognized in the real-world scene;
computing a head pose of the user and a set of visual occlusions in the scene as viewed from a viewpoint of the user;
presenting the plurality of visual representations on a see-through display as an augmented overlay to the user's view of the one or more objects in the real-world scene, wherein the plurality of visual representations are rendered based on predicted head pose based on the tracked head orientation;
analyzing actions of the user during the performance of the next task in response to the augmented overlay using the task understanding along with the models of respective procedures of the different tasks; and
if the user has not completed all tasks, modifying or creating new visual representations to be generated and presented as an augmented overlay of a second next step of the task understanding.

* * * * *